US012614331B2

(12) United States Patent
Li

(10) Patent No.: US 12,614,331 B2
(45) Date of Patent: Apr. 28, 2026

(54) OUTPUT METHOD AND ELECTRONIC DEVICE

(71) Applicant: Lenovo (Beijing) Limited, Beijing (CN)

(72) Inventor: Hongwei Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 218 days.

(21) Appl. No.: 18/389,132

(22) Filed: Nov. 13, 2023

(65) Prior Publication Data

US 2024/0221262 A1 Jul. 4, 2024

(30) Foreign Application Priority Data

Dec. 31, 2022 (CN) .......................... 202211735859.8

(51) Int. Cl.
| | |
|---|---|
| *G06T 13/40* | (2011.01) |
| *G06F 3/01* | (2006.01) |
| *G06T 13/20* | (2011.01) |

(52) U.S. Cl.
CPC .............. *G06T 13/40* (2013.01); *G06F 3/011* (2013.01); *G06T 13/205* (2013.01)

(58) Field of Classification Search
CPC ....... G06T 13/40; G06T 13/00; G06T 13/205; G06T 19/00; G06F 3/01; G06F 3/011; G06F 3/012; A63F 13/45; A63F 13/56; G06N 20/00; G06N 3/08; G06V 40/174; G06V 40/10
See application file for complete search history.

(56) References Cited

U.S. PATENT DOCUMENTS

| | | | |
|---|---|---|---|
| 2011/0009241 A1* | 1/2011 | Lane ........................ | G06F 3/011 |
| | | | 482/8 |
| 2015/0005073 A1* | 1/2015 | Cudak .................... | A63F 13/54 |
| | | | 463/42 |
| 2018/0056183 A1* | 3/2018 | Tezuka .................... | A63F 13/56 |
| 2021/0287416 A1* | 9/2021 | O'Hagan ................ | G06T 13/40 |
| 2022/0366810 A1* | 11/2022 | Chan .................... | G06F 3/04815 |

* cited by examiner

*Primary Examiner* — Xilin Guo
(74) *Attorney, Agent, or Firm* — ANOVA LAW GROUP, PLLC

(57) ABSTRACT
An output method includes controlling a virtual character to perform action according to a first mode and controlling the virtual character to perform action according to a second mode. The second mode is different from the first mode.

18 Claims, 8 Drawing Sheets

S101

Control the output virtual character to perform actions according to a first mode

S102

Control the output virtual character to perform actions according to a second mode different from the first mode

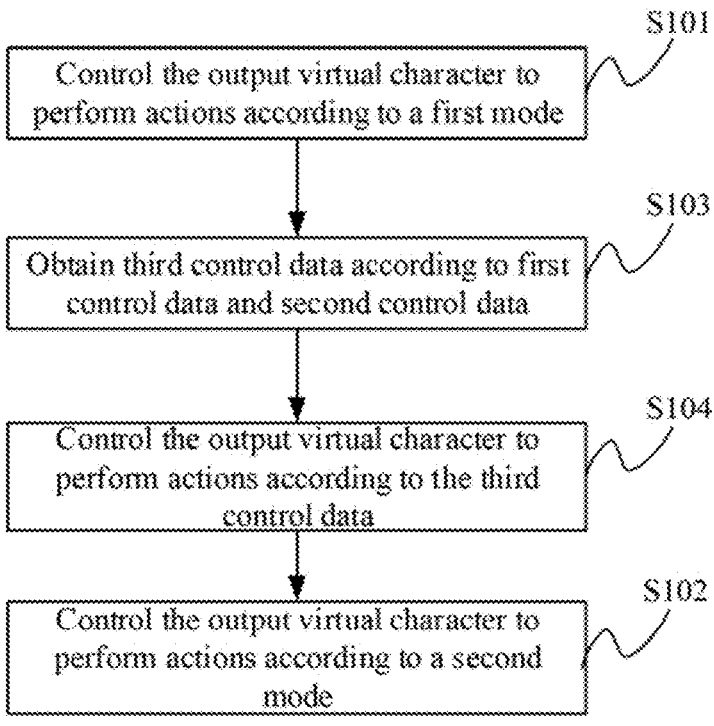

Control the output virtual character to perform actions according to a first mode — S101

Obtain third control data according to first control data and second control data — S103

Control the output virtual character to perform actions according to the third control data — S104

Control the output virtual character to perform actions according to a second mode — S102

FIG. 6

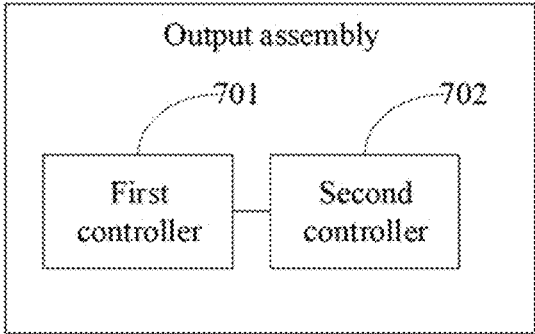

Output assembly

First controller 701

Second controller 702

FIG. 7

OUTPUT METHOD AND ELECTRONIC DEVICE

CROSS-REFERENCE TO RELATED APPLICATION

This application claims priority to Chinese Patent Application No. 202211735859.8, filed on Dec. 31, 2022, the entire content of which is incorporated herein by reference.

TECHNICAL FIELD

The present disclosure generally relates to the field of data processing technologies and, more particularly, to an output method and an electronic device.

BACKGROUND

With the development of technology, the application of virtual humans is becoming more and more popular. However, currently, virtual humans can only be controlled relying on data collected by action sensors worn by a person.

SUMMARY

In accordance with the present disclosure, there is provided an output method including controlling a virtual character to perform action according to a first mode and controlling the virtual character to perform action according to a second mode. The second mode is different from the first mode.

Also in accordance with the present disclosure, there is provided an electronic device including an output device configured to output a virtual character, and a processor configured to control the virtual character to perform action according to a first mode and control the virtual character to perform action according to a second mode. The second mode is different from the first mode.

BRIEF DESCRIPTION OF THE DRAWINGS

FIG. 6 is a flow chart of another output method consistent with the present disclosure.

FIG. 7 is a schematic structural diagram of an output assembly consistent with the present disclosure.

DETAILED DESCRIPTION OF THE EMBODIMENTS

Hereinafter, embodiments and features consistent with the present disclosure will be described with reference to drawings.

Various modifications may be made to the embodiments of the present disclosure. Thus, the described embodiments should not be regarded as limiting, but are merely examples. Those skilled in the art will envision other modifications within the scope and spirit of the present disclosure.

The accompanying drawings, which are incorporated in and constitute a part of this specification, illustrate embodiments of the present disclosure and, together with the general description of the present disclosure above and the detailed description of the embodiments below, serve to explain the principle of the present disclosure.

These and other features of the present disclosure will become apparent from the following description of non-limiting embodiments with reference to the accompanying drawings.

Although the present disclosure is described with reference to some specific examples, those skilled in the art will be able to realize many other equivalents of the present disclosure.

The above and other aspects, features, and advantages of the present disclosure will become more apparent in view of the following detailed description when taken in conjunction with the accompanying drawings.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure.

In the present disclosure, the phrases such as "in one embodiment," "in another embodiment," "in yet another embodiment," or "in other embodiments," may all refer to one or more of different embodiments in accordance with the present disclosure.

The present disclosure provides an output method. The output method may be applied to an electronic device capable of outputting a virtual character, such as a computer or a server with an output device. The output device may be a device capable of outputting the virtual character, such as a display panel or a projector. The present disclosure may improve users' experience of using the virtual character.

Figure 1:
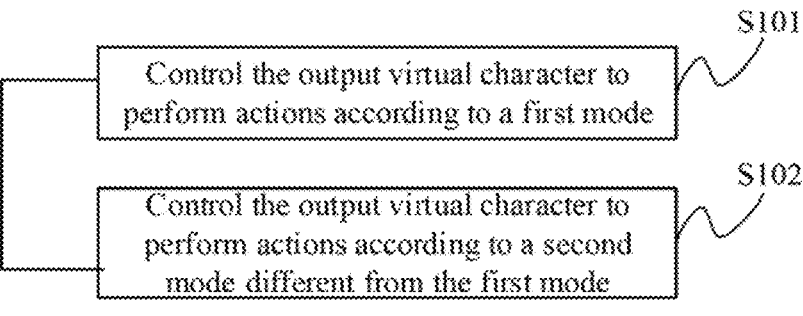
FIG. 1 is a flow chart of an output method consistent with the present disclosure.

In one embodiment shown in FIG. 1, the output method includes S101 and S102.

In S101, an output virtual character is controlled to perform actions according to a first mode.

Figure 2:
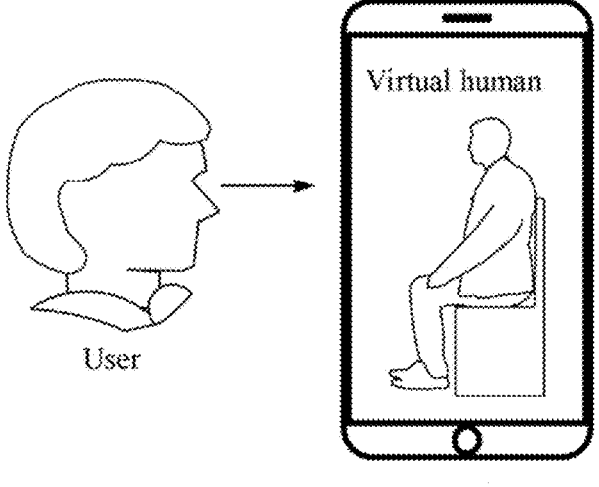
FIG. 2 is a schematic diagram showing a cell phone outputting a virtual human for a user consistent with the present disclosure.

The virtual character may be understood as a virtual character corresponding to an operator, such as a three-dimensional virtual human. As shown in FIG. 2, the operator's three-dimensional virtual human is rendered on the electronic device, such that the user of the electronic device is able to view the three-dimensional virtual human.

In the present embodiment, the virtual character may be output through the output device and the virtual character may be controlled to perform the actions, such that the virtual character performs the actions to provide corresponding services to the user of the electronic device.

In S102, the output virtual character is controlled to perform actions according to a second mode.

The first mode may be different from the second mode. That is, in this embodiment, the virtual character may be controlled to perform actions in different modes, thereby achieving flexible control of the virtual character.

In the output method provided by the present disclosure, the output virtual character may be controlled to perform actions in the variety of modes. In comparison to the existing technology that can only use the data collected by the action sensor to control the output virtual character, the present disclosure may use the variety of different modes to control the output virtual character to perform corresponding actions, therefore achieving flexible control of the virtual character. By increasing the flexibility of control, the virtual character may be able to provide users with better services, therefore improving the user's experience with the virtual character.

Further, in the present disclosure, the virtual character may be controlled in the variety of different modes, enabling the virtual character to achieve various control responses to meet the needs of the virtual character in different application scenarios.

In one embodiment, the first mode may be one of, and the second mode may be another of: controlling the virtual character to perform the actions at least according to first control data where the first control data is action data matching the operator's action, or controlling the virtual character to perform the actions at least according to second control data where the second control data is action data matching response results and the response results are obtained through responding to input/output.

In one embodiment, the first mode may be controlling the output virtual character to perform the actions based on at least the first control data; and the second mode may be controlling the output virtual character to perform the actions based on at least the second control data. In another embodiment, the first mode may be controlling the output virtual character to perform the actions based on at least the second control data; and the second mode may be controlling the output virtual character to perform the actions based on at least the first control data. That is, in the present disclosure, the virtual character may be controlled to perform the actions according to different action data.

Figure 3:
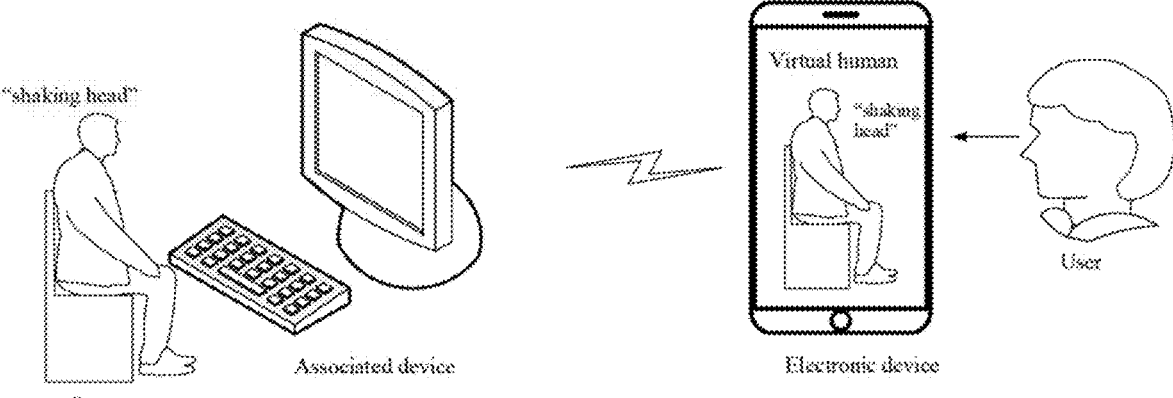
FIG. 3 and FIG. 4 are schematic diagrams showing a cell phone controlling a virtual human consistent with the present disclosure.

The operator may be an operator of an associated device connected to the electronic device. The action data in the first control data may be action data obtained by capturing the operator's action. The action data in the first control data may also be action data transmitted to the electronic device by the associated device corresponding to the electronic device. For example, as shown in FIG. 3, in one embodiment where the electronic device is a mobile phone as an example, and the operator is a user of a desktop computer. In the present embodiment, the action of the user of the desktop computer is captured and then the action data matching the action of the user of the desktop computer is transmitted to the mobile phone. For example, the user of the desktop computer swings head left and right, and the output virtual character on the mobile phone is controlled to perform a "shaking head" action based on the action data matching the action of the user of the desktop computer.

In one embodiment, the action data in the first control data may be obtained by collecting the images of the operator and identifying the operator's actions in the collected images to obtain the action data that matches the operator's action. For example, in one embodiment, a high-definition camera may be set up for the operator to collect the high-definition images of the operator, and then the operator's actions in the collected images may be recognized to obtain the action data matching the operator's actions. As another example, cameras with different definitions may be set for different body parts of the operator to collect sub-images for different body parts, and then action recognition may be performed on these sub-images to obtain the action data matching the operator's actions.

In another embodiment, the action data in the first control data may be obtained by collecting sensing parameters collected by a wearable device worn by the operator and analyzing the collected sensing parameters to obtain the action data matching the operator's actions.

In another embodiment, the action data in the first control data may be obtained by combing the image collection and the sensing parameter collection to obtain the action data matching the operator's actions. For example, in this embodiment, a high-definition camera may be set for the operator's face to collect images of the operator's face, a low-definition camera may be set for the operator's limbs and body to collect images of the operator's limbs and body, and the sensing parameters may be collected by the wearable device worn on the operator's fingers. Based on this, the collected sub-images and sensing parameters may be processed to obtain the action data that matches the operator's actions.

Input/output may be the input/output data generated by the user's operation on the electronic device, such as contents including voice, text, or other content input by the user. In this embodiment, the input/output data may be processed through data processing to obtain the response results for the input/output data, and then corresponding action data may be obtained according to the response results. The action data in the second control data may be the action data generated by the electronic device according to the response results.

In one embodiment, the input/output data may be processed on the electronic device to obtain the response results and the corresponding action data may be obtained according to the response results. In another embodiment, the user's input/output data may be transmitted to other devices through the electronic device. The other devices may include a cloud server. The cloud server may process the input/output data to obtain the response results and the corresponding action data according to the response results, and then transmit the action data to the electronic device.

Figure 4:
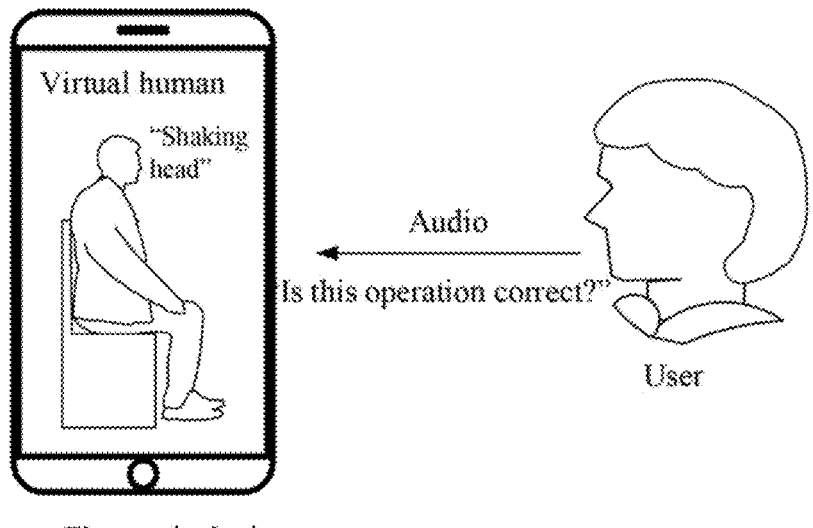

For example, as shown in FIG. 4, the mobile phone user performs voice input on the mobile phone, such as "Is this operation correct?". After the mobile phone collects the user's voice input through a microphone or other devices, the response results corresponding to the user's voice, such as "Wrong" may be obtained, and then the corresponding action data according to the response results, such as "shaking head," may be obtained according to the response results. Based on this, the virtual character output on the mobile phone may be controlled to perform the "shaking head" action based on the action data matching the response results.

For example, in one embodiment, an action processing model may be pre-trained, and the response results may be input into the action processing model, such that the action processing model outputs the action data that matches the response results. For example, the response results "wrong" may be input to the action processing model, and the action processing model may output the corresponding action data "shaking head."

As another example, in another embodiment, an action list may be pre-configured, which contains multiple sets of action data, and each set of action data corresponds to one or more response results. Based on this, the matching action data may be searched for in the action list according to the response results corresponding to the input/output. For example, the action data corresponding to the response result "Wrong" may be searched in the action list, thereby obtaining the action data "shaking head" that matches the response result "wrong".

In one embodiment, the action data in the first control data may be obtained by: receiving a transmitted data packet where the data packet contains audio data or action data corresponding to the same target time period; and processing the data packet to obtain the audio data and action data in the data packet. The action data in the data packet may be used as the first control data to control the output virtual character to perform the actions, and the audio data in the data packet may be used to control the sound signal corresponding to the virtual character.

For example, in one embodiment, the sound signal in the audio data may be directly output as the sound signal of the virtual character. In another embodiment, signal conversion may be performed to the sound signal extracted from the audio data, for example, according to specific timbre, sound quality or other parameters. Then the converted sound signal may be output as the sound signal corresponding to the virtual character.

Further, the audio data in the data packet may also be used to control the virtual character to perform actions. For example, the audio data may be used to control the lips of the virtual character to close or open correspondingly.

In one embodiment, the data packet may be obtained by processing the audio data and action data within the target time period by the associated device corresponding to the electronic device. For example, the associated device may divide the audio data and action data into data blocks according to the timestamps, and then package the audio data blocks and action data blocks corresponding to the same timestamps to obtain the data packet. After that, the associated device may transmit the data packet to the electronic device according to the sequence of the time-stamps, such that the electronic device is able to receive the data packet.

In one embodiment, when processing the data packet, the electronic device may first decode the data packet to obtain the data blocks in the data packet, and then splicing the data blocks according to the timestamps to obtain the audio data and action data within the target time period.

In the present disclosure, the data packets received may multiplex the action data and the audio data. Therefore, through the transmission of the small data packet, the data transmission delay between the electronic device and the associated device may be reduced, and the data transmission efficiency may be improved. Furthermore, by decoding the action data in the data packet, the performance of control of the virtual character based on the decoded action data may be improved.

In one embodiment, S102 where the output virtual character is controlled to perform the actions according to the second mode may include: detecting whether a switch condition is met and controlling the output virtual character to perform the actions according to the second mode in response to the switch condition which is met.

On the electronic device, the virtual character may be controlled according to the first method to perform the actions. In the process of maintaining the output of the virtual character, whether the switch condition is met may be continuously monitored. When the switch condition is met, it may be switched from controlling the output virtual character to perform the actions according to the first mode to controlling the output virtual character to perform the actions according to the second mode. Therefore, the switch of the control modes of the virtual character for performing the actions may be achieved through determining the switch condition.

Further, in one embodiment, when a recovery condition is met, it may be switched back to controlling the output virtual character according to the first mode to perform the actions. The recovery condition may be a condition corresponding to the switch condition.

In the present disclosure, through the configuration of the switch condition, it may be realized to control the virtual character in different modes over time, without the need to manually trigger the switching. The complexity of the operation may be reduced. During this process, the virtual character may continue to perform the actions to provide corresponding services, thereby ensuring that services are not interrupted and improving the reliability of services provided by the virtual character.

In one embodiment, the switch condition may include at least one of:

a first switch condition: the matching degree between the action data used for controlling the output virtual character to perform the actions in the first mode and the operator's action satisfies a first control condition (also referred to as a "first matching-degree control condition");

a second switch condition: action parameters of key points included in the action data used for controlling the output virtual character to perform the actions in the first mode do not meet action constraint conditions corresponding to the parts to which the key points belong;

a third switch condition: the duration of the virtual character being output is longer than or equal to a preset duration threshold;

a fourth switch condition: the action data used for controlling the output virtual character to perform the actions in the second mode is received;

a fifth switch condition: interaction actions performed after the virtual character is output satisfy an interaction control condition, where the interaction control condition may include that the number of interactions between the virtual character after being output and the user of the electronic device is larger than or equal to a number threshold or that the interaction action performed by the virtual character after being output is a preset action type;

a sixth switch condition: a switch instruction is received, where the switch instruction may be generated based on the switch operation of the user of the electronic device; or a seventh switch condition: the response result used to match the action data in the first mode is not obtained, where the action data is used to control the virtual character to perform the actions.

In the first switch condition, the first control condition may include that the parameter value characterizing the matching degree is less than or equal to a parameter thresh-old. The parameter value characterizing the matching degree may be a data confidence parameter contained in the action data, and the parameter threshold may be a preset confidence threshold. That is, when the data confidence of the action data in the first mode is low, the first mode may be switched to the second mode to control the virtual character to perform actions.

In the second switch condition, the action data may be composed of action sub-data corresponding to multiple parts of the virtual character. Each part corresponding to each action sub-data may have an action constraint condition. The action constraint condition may include an offset threshold of each key point on the part in any displacement offset direction. That the action parameters of the key points satisfy the action constraint conditions corresponding to the parts to which the key points belong, may include: the offset of the key points in the current displacement offset direction is less than or equal to the offset threshold. That is, when the displacement offset of each key point of the action data in the first mode is within the offset threshold range, the virtual character may be controlled to perform the action according to the first mode. Once it is found that any key point has the offset in the current displacement offset direction exceeding the offset threshold, it may be indicated that the action constraint conditions are not satisfied. At this time, the first mode may be switched to the second mode to control the virtual character to perform the actions.

In the third switch condition, the duration during which the virtual character is output may be recorded starting from when the virtual character is output by the output device. That is, starting from the time when the virtual character is output by the output device, the virtual character may be controlled to perform the actions according to the first mode. When the duration of the virtual character being output reaches the duration threshold, it may be switched from the first mode to the second mode to control the virtual character to perform the actions.

In the fourth switch condition, before the action data in the second mode is received by the electronic device, the virtual character may be controlled to perform the action according to the first mode. When the action data in the second mode is received by the electronic device, it may be switched from the first mode to the second mode to control the virtual character to perform the actions.

In the fifth switch condition, starting from the time when the virtual character is output, the virtual character may be controlled to perform the actions according to the first mode. When the number of interaction actions between the virtual character and the user of the electronic device is greater than or equal to the number threshold, it may be switched from the first mode to the second mode to control the virtual character to perform the actions. Alternatively, starting from the time when the virtual character is output, the virtual character may be controlled to perform the actions according to the first mode. When the virtual character performs an action of a preset action type, it may be switched from the first mode to the second mode to control the virtual character to perform the actions.

In the sixth switch condition, starting from the time when the virtual character is output, the virtual character may be controlled to perform the actions according to the first mode. When receiving the switch instruction generated by the user of the electronic device, it may be switched from the first mode to the second mode to control the virtual character to perform the actions.

In the seventh switch condition, starting from the time when the virtual character is output, the virtual character may be controlled to perform the actions according to the first mode. When the response result used to match the action data in the first mode is not obtained, it may be switched from the first mode to the second mode to control the virtual character to perform the actions.

Figure 5:
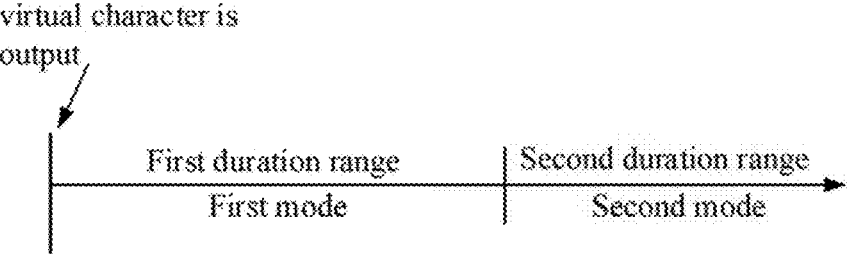
FIG. 5 is a schematic diagram showing switch control of virtual characters consistent with the present disclosure.

After the virtual character is output, the virtual character may first be controlled to perform actions according to the first mode. When any of the above switch conditions is met, the virtual character may be switched to being controlled to perform the actions according to the second mode. Therefore, within the first duration range after the virtual character is output, the virtual character may perform the actions according to the first mode. When the switch condition is satisfied, that is, within the second duration range after the virtual character is output, the virtual character may perform the actions according to the second mode, as shown in FIG. 5.

In one embodiment, the first control data may include the action data matching the operator's action, and the second control data may include the action data matching the response results where the response results are obtained in response to the input/output. In another embodiment, the first control data may include the action data matching the operator's action, and the second control data may include prediction data predicted based on the action data in the first control data.

For example, in one embodiment, the virtual human is output on the mobile phone in FIG. 2. First, after the virtual human is output, the virtual human may be controlled to perform the actions according to the action data matching the response results corresponding to the user's input voice. After receiving the action data matching the operator's action sent from the associated device, the virtual human on the mobile phone may be controlled to perform the actions according to the action data sent from the associated device, and the data confidence level of the action data transmitted from the associated device may be continuously monitored to detect whether the data confidence level meets the first control condition, that is, whether the data quality of the action data is low. When the data confidence of the action data meets the first control condition, the virtual human may be controlled to perform the action by switching to according to the action data matching the response results corresponding to the user's input voice, and the data confidence level of the action data transmitted from the associated device may be continuously monitored to detect whether the data confidence level meets the first control condition. When the data confidence of the action data does not meet the first control condition, that is, the data quality of the action data is high, the virtual human on the mobile phone may be controlled according to the action data transmitted from the associated device to perform the actions. In addition, in one embodiment, whether the action parameters of the key points contained in the action data transmitted from the associated device meet the corresponding the action constraint conditions, such as whether the head turning angle is too large, etc., may be continuously monitored. When the action parameters do not meet the action constraint conditions, the virtual human may be controlled to perform the action by switching to according to the action data matching the response results corresponding to the user's input voice until the action parameters in the received action data meet the action constraint conditions, and then the virtual human may be controlled to perform the action by switching to according to the action data transmitted from the associated device, and so on. Therefore, the control method of the virtual human may be continuously switched, to ensure that the virtual human is able to provide users with more complete services.

In another embodiment, the virtual human is output on the mobile phone in FIG. 2. First, after the virtual human is output, the virtual human may be controlled to perform the actions according to the action data matching the response results corresponding to the user's input voice, and the duration of the virtual human being output may be timed. When the duration reaches the duration threshold, the virtual human on the mobile phone may be controlled to perform the actions according to the action data transmitted from the associated device, and whether the data confidence level of the action data transmitted from the associated device meets the first control condition may be continuously monitored. When the data confidence of the action data meets the control condition, the virtual human may be controlled to perform the actions by switching to according to the action data matching the response results corresponding to the user's input voice, and so on.

In another embodiment, the virtual human is output on the mobile phone in FIG. 2. First, after the virtual human is output, the virtual human may be controlled to perform the actions according to the action data matching the response results corresponding to the user's input voice, and the number of interactions between the virtual human and the user and the actions performed by the virtual human may be recorded. When the recorded number of interactions reaches 3 or the virtual human performs a prompt action of "please wait for manual", the virtual human on the mobile phone may be controlled to perform the actions according to the action data transmitted from the associated device.

In another embodiment, the virtual human is output on the mobile phone in FIG. 2. First, after the virtual human is output, the virtual human may be controlled to perform the actions according to the action data matching the response results corresponding to the user's input voice. When receiving a switch instruction corresponding to the user's input voice of "Please find human customer service", the virtual human on the mobile phone may be controlled to perform the actions according to the action data transmitted from the associated device.

In another embodiment, the virtual human is output on the mobile phone in FIG. 2. First, after the virtual human is output, the virtual human may be controlled to perform the actions according to the action data matching the response results corresponding to the user's input voice. After the user inputs voice, the input voice may be collected. When the collected voice does not have a corresponding response result, that is, the corresponding action data cannot be matched according to the response result, the virtual human on the mobile phone may be controlled to perform the actions by switching to according to the action data transmitted from the associated device. Or, when the voice input by the user is not collected and the corresponding response result cannot be obtained, the action data matching the response result may not be able to be obtained, the virtual human on the mobile phone may be controlled to perform the actions by switching to according to the action data transmitted from the associated device. Or, after collecting the input voice, when the response result corresponding to the collected invoice does not meet the confidence condition, for example, when classification probability corresponding to the response result output from a pre-trained natural language processing model with respect to the input voice is low, the corresponding action data may not be able to be matched according to the response result and the virtual human on the mobile phone may be controlled to perform the actions by switching to according to the action data transmitted from the associated device. Or, after collecting the input voice, when the action data matched by the response result corresponding to the collected invoice does not meet the confidence condition, for example, when classification probability output by an action processing model with respect to the response result is low, the action data may be determined to be unreliable, and the virtual human on the mobile phone may be controlled to perform the actions by switching to according to the action data transmitted from the associated device.

In some embodiments, after controlling the virtual character to perform the actions according to the first mode in S101 and before controlling the virtual character to perform the actions according to the second mode in S102, as shown in FIG. 6, the method may further include S103 and S104.

In S103, third control data may be obtained according to the first control data and the second control data.

The first control data may be data used to control the output virtual character to perform the actions in the first mode, and the second control data may be data used to control the output virtual character to perform the actions in the second mode.

For example, the first control data may include one of, and the second control data may include another one of: action data matching the operator's action or prediction action data for the operator based on historical action data corresponding to the action data, and action data matching the response results which are obtained in response to input/output.

In one embodiment, based on the action data in the first control data, interpolated frame data, that is, the third control data, may be obtained according to the action data in the second control data. The interpolated frame data may include the action data. The action parameters of each key point in the action data in the interpolated frame data may be between the action parameters of the corresponding key points in the action data in the first control data and the action parameters of the corresponding key points in the action data in the second control data.

In S104, the output virtual character may be controlled to perform the actions according to the third control data.

Before switching from the first mode to the second mode, the action control of the virtual character may be performed by interpolated frame based on the action data in the first mode combined with the action data in the second mode. Subsequently, the action control of the virtual character may be performed according to the action data in the second mode, to achieve smooth control of the virtual character.

In one embodiment, the virtual human is output on the mobile phone in FIG. 2. First, after the virtual human is output, the virtual human may be controlled to perform the actions according to the action data matching the response results corresponding to the user's input voice. When receiving the action data matching the operator's action transmitted from the associated device, the interpolated frame data may be obtained first based on the action data matching the response result corresponding to the user's input voice and the received action data, and the virtual human on the mobile phone may be controlled to perform the action according to the interpolated frame data. Subsequently, the virtual human on the mobile phone may be controlled to perform the action according to the action data transmitted from the associated device, and whether the data confidence level of the action data transmitted from the associated device meets the first control condition may be continuously monitored. When the data confidence level of the action data meets the first control condition, that is, the data confidence is lower than or equal to the confidence threshold, prediction may be performed on the historical action data corresponding to the action data (action data with data confidence level higher than the confidence threshold) to obtain the predicted action data. The virtual human may be controlled to perform the actions according to the predicted action data. When the action parameters of the key points contained in the predicted action data do not meet the corresponding action constraints, the interpolated frame data may be obtained according to the predicted action data and the response results corresponding to the user's input voice, and the virtual human on the mobile phone may be controlled to perform the actions according to the interpolated frame data. Then the virtual human may be controlled to perform the actions by switching to according to the action data matching the response result corresponding to the user's input voice. When the data confidence level of the received action data is higher than the confidence threshold, the virtual human may be controlled to perform the actions by switching to according to the action data transmitted from the associated device, and so on. Therefore, the action execution of the virtual human may be smoother.

In one embodiment, when the virtual character is controlled to perform the actions according to the first mode, the interaction information may be recorded. The interaction information may be stored in a designated storage area in the electronic device such that it may be obtained when the virtual character is controlled in the second mode to be provided as reference information for controlling the virtual character in the second mode.

The interaction information may include at least one of text keywords, voice clips, or video clips corresponding to the interaction between the virtual character and the user of the electronic device when the virtual character is controlled according to the first mode.

In one embodiment, the interaction information may be sent by the electronic device to the associated device after being recorded, to be provided to the operator of the associated device as reference information for performing corresponding actions.

In some other embodiments, the interaction information may be retrieved by the associated device from the storage area in the electronic device, to be provided to the operator of the associated device as reference information for performing corresponding actions.

In one embodiment, the output virtual character may be selected to be controlled to perform the actions according to the first mode or the second mode by setting conditions.

When a first condition is met, the output virtual character may be controlled to perform the actions according to the first mode.

When the second condition is met, the output virtual character may be controlled to perform the actions according to the second mode.

In the present disclosure, through the configuration of the first condition and the second condition, it may be flexibly switched to control the virtual character in the first mode or the second mode, thereby achieving flexible control of the virtual character.

The first condition may include at least one of:

a first item: the matching degree between the action data used to control the output virtual character to perform the actions in the first mode and the operator's action satisfies a second control condition (also referred to as a "second matching-degree control condition"), where the second control condition may include that the parameter value characterizing the matching degree is larger than a parameter threshold;

a second item: the action parameters of the key points contained in the action data used to control the outputted virtual character to perform the actions in the first mode satisfy the action constraint conditions corresponding to the parts to which the key points belong;

a third item: the duration of the output of the virtual character is shorter than or equal to the preset duration threshold;

a fourth item: the action data used to control the output virtual character to perform the action in the first mode is received;

a fifth item: the interaction action performed after the virtual character is output meets the interaction control condition;

a sixth item: a first instruction is received, where the first instruction is generated based on the first operation of the user of the electronic device; or a seventh item: the response result used to match the action data in the second mode is not obtained, where the action data is used to control the virtual character to perform the actions in the second mode.

The second condition may include at least one of:

a first item: the matching degree between the action data used to control the output virtual character to perform the actions in the first mode and the operator's action does not satisfy the second control condition;

a second item: the action parameters of the key points contained in the action data used to control the outputted virtual character to perform the actions in the first mode do not satisfy the action constraints corresponding to the parts to which the key points belong;

a third item: the duration of the output of the virtual character is longer than the preset duration threshold;

a fourth item: the action data used to control the output virtual character to perform the action in the first mode is not received;

a fifth item: the interaction action performed after the virtual character is output does not meet the interaction control condition;

a sixth item: a second instruction is received, where the second instruction is generated based on the second operation of the user of the electronic device; or a seventh item: the response result used to match the action data in the first mode is not obtained, where the action data is used to control the virtual character to perform the actions in the first mode.

When at least one item of the first condition is satisfied, the output virtual character may be controlled to perform the actions according to the first mode. When at least one item of the second condition is satisfied, the output virtual character may be controlled to perform the actions according to the second mode.

In some embodiments, in S101, the first mode may be a mode to control a first sub-object in the output virtual character to perform the actions. In S102, the second mode may be a mode to control a second sub-object in the output virtual character to perform the actions. The first sub-object and the second sub-object may be different.

In the present embodiment, action control may be performed on the corresponding sub-objects in the virtual character according to different modes. For example, for the virtual human output on the mobile phone in FIG. 2, after the virtual human is output, the body of the virtual human may be controlled according to the first mode to perform corresponding actions, and the face and fingers of the virtual human on the mobile phone may be controlled according to the second mode to perform corresponding actions.

In the present embodiment, for the virtual character, the action control may be performed on the different sub-objects of the virtual character according to different modes at the same time in space, therefore achieving flexible control of the virtual character.

In one embodiment, the first sub-object and the second sub-object of the virtual character may be simultaneously output. Therefore, the output first sub-object may be controlled to perform the actions according to the first mode, and at the same time, the second sub-object may be controlled to perform the actions according to the second mode.

In one embodiment, the first mode may be a mode of controlling the first sub-object to perform the actions based on at least the first control data, and the second mode may be a mode of controlling the second sub-object to perform the actions based on at least the second control data. The first control data and the second control data may be different.

In one embodiment, the first control data may include one of, and the second control data may include another one of:

a first item: the action data matching the operator's actions or the audio data matching the operator's audio; and a second item: the action data matching the response results where the response results are obtained by responding to the input/output.

In this embodiment, the action control may be performed on the corresponding sub-objects of the virtual character according to different control data. For example, for the virtual human output on the mobile phone in FIG. 2, after the virtual human is output, the face of the virtual human may be controlled to perform the corresponding actions according to the action data obtained by collecting and processing images of the operator, the fingers of the virtual human may be controlled to perform the corresponding actions according to the action data collected by the wearable device worn on the operator's fingers, and the lips of the virtual human may be controlled to perform the corresponding actions according to the action data matched to the response results corresponding to the input voice of the user of the mobile phone.

In another embodiment, the first mode may be a mode of controlling the first sub-object to perform the actions based on a first control parameter, and the second mode may be a mode of controlling the second sub-object to perform the actions based on a second control parameter. The first control parameter and the second control parameter may be different.

The control parameters may include at least one of control frame rate or control precision. For example, the first control parameter may include the first control frame rate and/or the first control precision, and the second control parameter may include the second control frame rate and/or the second control precision. The first control frame rate and the second control frame rate may be different, and the first control precision and the second control precision may be different.

For example, for the virtual human output on the mobile phone in FIG. 2, after the virtual human is output, the face of the virtual human may be controlled to perform the corresponding actions according to the action data obtained through the higher first control frame rate and/or the higher first control precision, and the body and limbs of the virtual human may be controlled to perform the corresponding actions according to the action data collected through the lower second control frame rate and/or the lower second control precision.

In the present embodiment, the action control may be performed on the corresponding sub-objects of the virtual character according to different modes in space at the same time. The parts of the virtual character may be divided to different levels according to the received attention or influence. A mode with a higher frame rate and/or higher precision may be used to control parts with higher attention levels or higher influence levels to perform the actions, which may make the actions of these parts have a higher precision, fluency and sensitivity. A mode with a lower frame rate and/or lower precision may be used to control parts with lower attention levels or lower influence levels to perform the actions. Since the frame rate and precision are both lower, the amount of the necessary action data may be relatively low and the amount of data processing may be reduced.

Also, when the control of parts such as face or upper limbs of the virtual character uses action data that matches the operator and the control of parts such as the body of the virtual character uses action data that matches the response results without the operator's actions, the operator's entire body may be not required to participate in the service while ensuring that the virtual character is able to provide accurate services to the user. The operator's operational complexity and physical exertion may be reduced.

The present disclosure also provides an output assembly. The output assembly may be disposed in an electronic device that is capable of outputting a virtual character, such as a computer or a server with an output device. The output device may be a device capable of outputting the virtual character such as a display panel or a projector. The present disclosure may improve the user's experience of using the virtual character.

In one embodiment shown in FIG. 7, the output assembly may include:

a first controller 701, configured to control the output virtual character to perform actions according to the first mode; and a second controller 702, configured to control the output virtual character to perform actions according to the second mode. The second mode may be different from the first mode.

In some embodiments, the output assembly may also include a collection circuit, which is used to collect multimedia interaction data of the user of the electronic device. The multimedia interaction data may include data generated by the user's interaction with the virtual character, such as the user's audio data or video data.

In some embodiments, the output assembly may also include a communication circuit, which is used to transmit the multimedia interaction data to the associated device corresponding to the electronic device, such that the associated device outputs the multimedia interaction data for the operator of the associated device to promptly and accurately provide the users with corresponding services.

In the output assembly provided by the present disclosure, the output virtual character may be controlled to perform actions in the variety of modes. In comparison to the existing technology that can only use the data collected by the action sensor to control the output of the virtual character, the present disclosure may use the variety of different modes to control the output virtual character to perform corresponding actions, therefore achieving flexible control of the virtual character. By increasing the flexibility of control, the virtual character may be able to provide users with better services, therefore improving the user's experience with the virtual character.

In one embodiment, the first mode may be one of and the second mode may be another of: controlling the virtual character to perform the actions at least according to first control data where the first control data is action data matching the operator's action, or controlling the virtual character to perform the actions at least according to second control data where the second control data is action data matching the response results and the response results are obtained through responding to input/output.

In one embodiment, the action data in the first control data may be obtained by: receiving a transmitted data packet where the data packet contains audio data or action data corresponding to the same target time period; and processing the data packet to obtain the audio data and action data in the data packet. The action data in the data packet may be used as the first control data to control the output virtual character to perform the actions, and the audio data in the data packet may be used to control the sound signal corresponding to the virtual character.

In one embodiment, the second controller 702 may be configured to control the virtual character to perform the actions according to the second mode when the switch condition is met.

The switch condition may include at least one of:

the matching degree between the action data used for controlling the output virtual character to perform the actions in the first mode and the operator's action satisfies a first control condition;

the action parameters of the key points included in the action data meet action constraints corresponding to the parts to which the key points belong;

the duration of the virtual character being output is longer than or equal to a preset duration threshold; or the action data used for controlling the output virtual character to perform the actions in the second mode is received.

Figure 8:
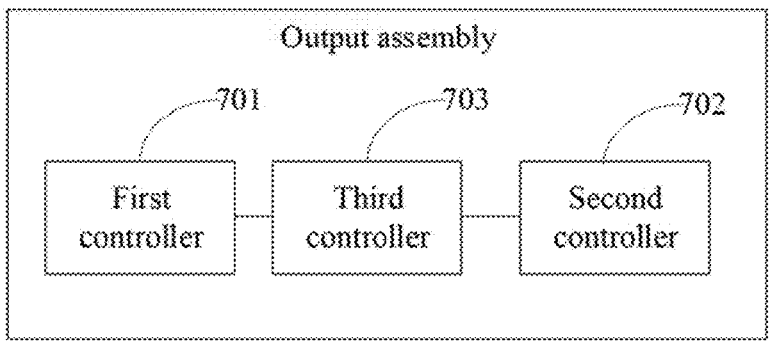
FIG. 8 and FIG. 9 are schematic structural diagrams of another output assembly consistent with the present disclosure.

In one embodiment shown in FIG. 8, the assembly may further include a third controller 703, configured to obtain the third control data according to the first control data and the second control data before the second controller 702 controls the output virtual character to perform the actions according to the second mode, and configured to control the output virtual character to perform the actions according to the third control data. The first control data may be the data used to control the output virtual character to perform the actions in the first mode, and the second control data may be the data used to control the output virtual character to perform the actions in the second mode.

Figure 9:
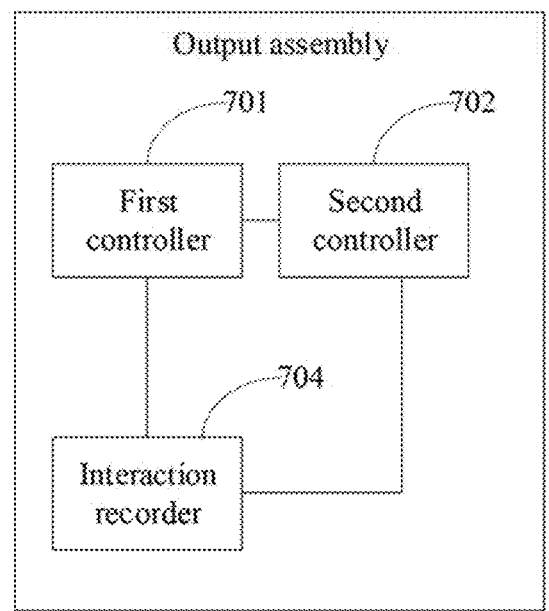

In one embodiment shown in FIG. 9, the assembly may further include an interaction recorder 704, configured to record the interaction information when the virtual character is controlled to perform the actions according to the first mode. The interaction information may be able to be obtained at least before the virtual character is controlled to perform the actions according to the second mode.

In one embodiment, when the first condition is satisfied, the first controller 701 may control the output virtual character to perform the actions according to the first mode; when the second condition is satisfied, the second controller 702 may control the output virtual character to perform the actions according to the second mode.

The first condition may include at least one of:

the matching degree between the action data used to control the output virtual character to perform the actions in the first mode and the operator's action satisfies a control condition;

the action parameters of the key points contained in the action data satisfy the action constraint conditions corresponding to the parts to which the key points belong;

the duration of the output of the virtual character is longer than or equal to the preset duration threshold; or the action data is received.

The second condition may include at least one of:

the matching degree between the action data and the operator's action does not satisfy the control condition;

the action parameters of the key points contained in the action data do not satisfy the action constraint conditions corresponding to the parts to which the key points belong;

the duration of the output of the virtual character is shorter than the preset duration threshold; or the action data is not received.

In some embodiments, the first mode may be a mode to control a first sub-object in the output virtual character to perform the actions, and the second mode may be a mode to control a second sub-object in the output virtual character to perform the actions. The first sub-object and the second sub-object may be different.

In one embodiment, the first sub-object and the second sub-object of the virtual character may be output at the same time through the output device. The first controller 701 may control the first sub-object in the output virtual character to perform the actions according to the first mode, and the second controller 702 may control the second sub-object in the output virtual character to perform the actions according to the second mode at the same time.

In one embodiment, the first mode may be a mode of controlling the first sub-object to perform the actions based on at least the first control data, and the second mode may be a mode of controlling the second sub-object to perform the actions based on at least the second control data. The first control data and the second control data may be different.

In one embodiment, the first control data may include one of, and the second control data may include another one of:

the action data matching the operator's actions or the audio data matching the operator's audio; or the action data matching the response results.

In another embodiment, the first mode may be a mode of controlling the first sub-object to perform the actions based on a first control parameter, and the second mode may be a mode of controlling the second sub-object to perform the actions based on a second control parameter. The first control parameter and the second control parameter may be different.

The control parameters may include at least one of control frame rate or control precision.

For the details of the units, references may be made to the method embodiments described previously.

Figure 10:
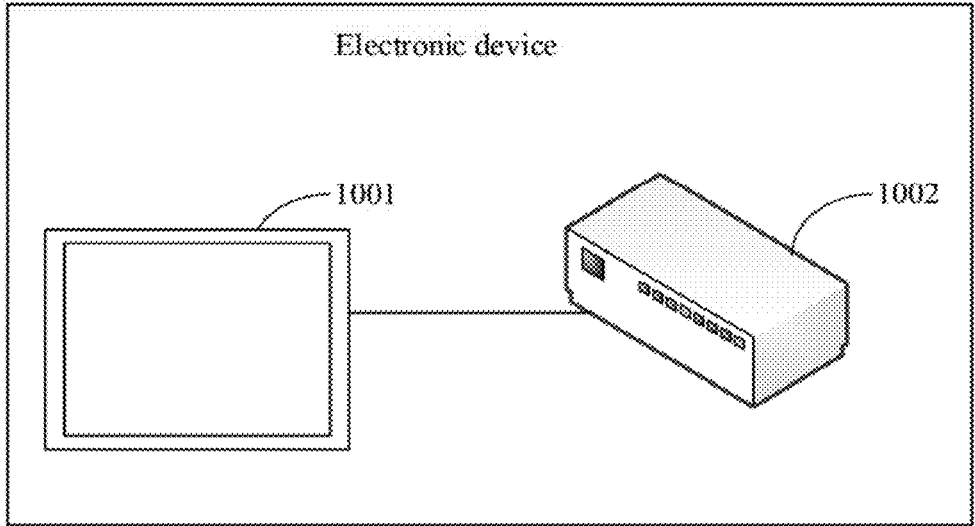
FIG. 10 is a schematic structural diagram of an electronic device consistent with the present disclosure.

The present disclosure also provides an electronic device. As shown in FIG. 10, in one embodiment, the electronic device includes:

an output device 1001, configured to output a virtual character; and a processor 1002, configured to control the output virtual character to perform the actions according to a first mode, and control the output virtual character to perform the actions according to a second mode. The first mode may be different from the second mode.

The processor 1002 may be implemented as a single processor or multiple processors.

In the electronic device provided by the present disclosure, the output virtual character may be controlled to perform actions in the variety of modes. In comparison to the existing technology that can only use the data collected by the action sensor to control the output of the virtual character, the present disclosure may use the variety of different modes to control the output virtual character to perform corresponding actions, therefore achieving flexible control of the virtual character. By increasing the flexibility of control, the virtual character may be able to provide users with better services, therefore improving the user's experience with the virtual character.

In some embodiments, the electronic device may also include a collection device, which is used to collect multimedia interaction data of the user of the electronic device. The multimedia interaction data may include data generated by the user's interaction with the virtual character, such as the user's audio data or video data.

In some embodiments, the electronic device may also include a communication device, which is used to transmit the multimedia interaction data to the associated device corresponding to the electronic device, such that the associated device outputs the multimedia interaction data for the operator of the associated device to promptly and accurately provide the users with corresponding services.

The present disclosure will be described by using a virtual human driving scenario as an example.

In the virtual human real-time driving solution, the operator (a real person) may be usually used to configure the wearable device for real-time action capture, and the captured actions may be applied to the model human, that is, the virtual human, such that the virtual human performs actions.

As the main direction of action capture, there are some main problems in action capture based on computer vision (CV).

1: The posture is empty when the operator is not in place, and there will be a series of unexpected actions when entering. These actions are invalid data.

2: When the operator makes some movement such as turning head, leaving briefly, etc., the camera cannot obtain a complete human body image, resulting in data freezes, jumps, or movement distortions.

3: When remote action capture and transmission are performed, action capture data packet loss or delay will also cause the problem in 2; or 4: The operator is too far away from the camera, or is too tilted, hence the quality of the action capture data is poor.

The present disclosure provides a solution for smooth output of action capture data for controlling a virtual human, which may be able to maintain the accuracy and smoothness of the virtual human's action output when action capture data fluctuates or is lacking.

Figure 11:
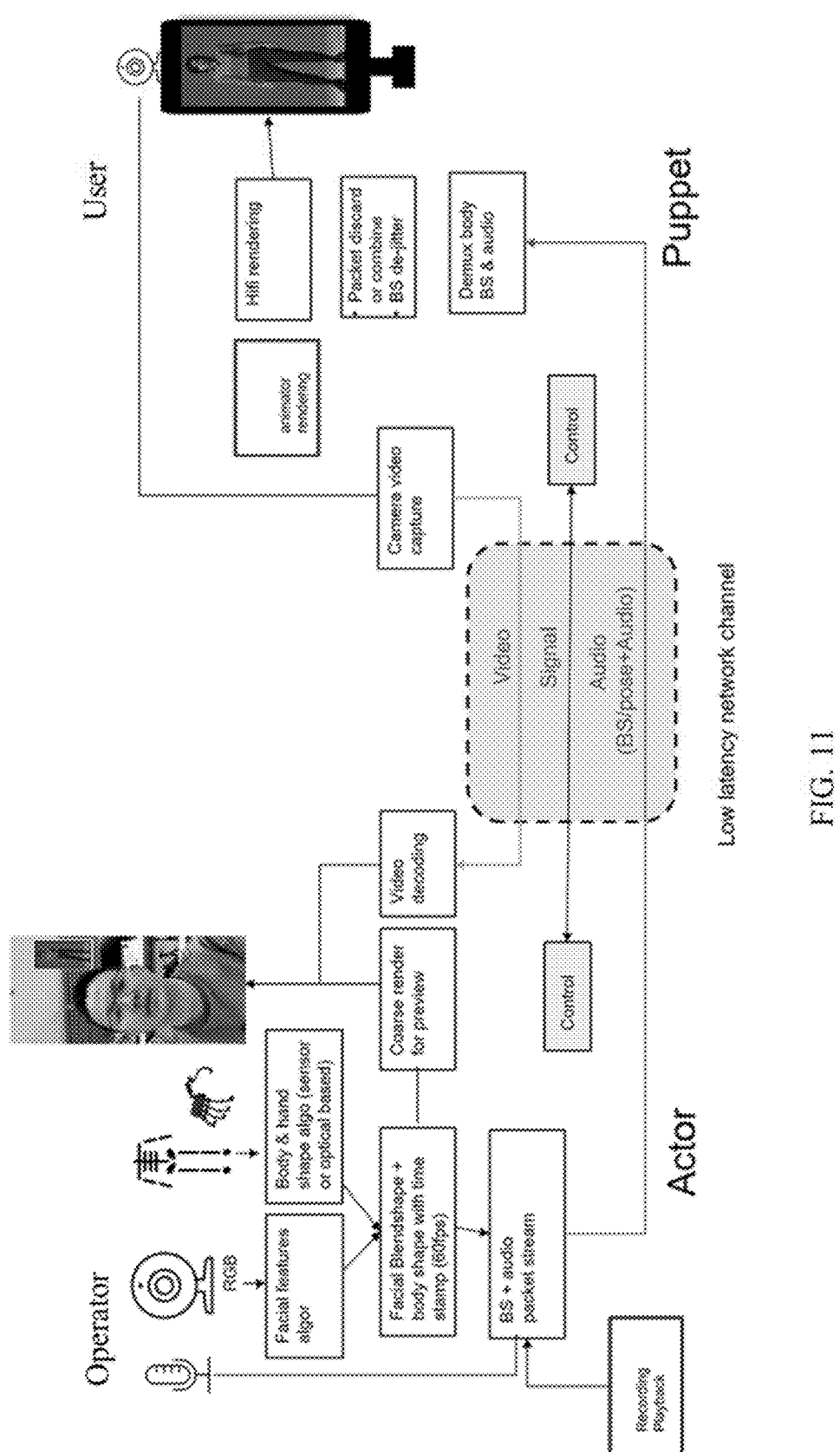
FIG. 11 is a flow chart of an application scenario in a smart customer service scenario consistent with the present disclosure.

As shown in FIG. 11, on the operator side, a microphone for collecting sound signals and an RGB camera for collecting images may be set up for the operator, and a wearable device may be worn on the fingers or other parts of the operator. The wearable device may include a plurality of sensors used to collect action data of key points on the wearing parts. On the user (customer) side, devices such as displays, microphones, and cameras may be configured for users. Based on this, the following processing flow is provided in this embodiment.

The following processes may be performed on the operator side.

First, on the operator side, the best position frame for image acquisition may be output to the operator to remind the operator to enter the position frame through position movement. Therefore, prompt may be provided to the operator to sit in a suitable position when the seat is too far away.

Based on this, audio data may be obtained on the operator side. The audio data may include sound signals collected by the microphone or preset recordings (i.e., recording playback). The RGB camera on the operator side may collect images for the operator. The sub-images where the face region is located may be processed through the facial features algorithm (Facial Features Algo) to obtain the action parameters of multiple key points of the face for characterizing the facial expressions and movements. Sensors of the wearable device worn on the fingers of the operator may collect sensor collection parameters on the fingers, and the RGB camera may collect sub-images of the body area for the operator. Based on this, the sensor collection parameters and body area sub-images may be processed according to the body and hand shape processing algorithm (Body & hand shape algo) to obtain the action data of the body and fingers, and then the facial expression movements and the action data of the body and fingers may be mixed according to the preset frame rate time stamp such as 60 fps to obtain the operator's action data (That is, Facial blend shape+body shape).

Subsequently, the audio data and action data may form a data packet stream according to the timestamps, that is, BS+audio packet stream, such that the action data may be transmitted in real time through the transmission channel of multiplexed audio data. The BS (blend shape) here refers to the operator's action data obtained through mixing in the previous embodiments.

Finally, the data packet stream may be transmitted to the user-side device through the low latency network channel. Video data video, mixed data such as data packets containing action data BS/pose and audio data audio, or other signals may be be transmitted with low delay in the low-latency network channel.

On the operator-side device, the operator's action data may also be used to control the action of the virtual human output by the operator side. That is to say, the operator-side device may not only output for the operator the images collected by the RGB camera, but also render the corresponding virtual human for the operator and control the virtual human based on the obtained action data, that is, Coarse render for preview, which realizes the rendering preview of the virtual human on the operator side.

On the user side, after the user side receives the data packet stream transmitted by the operator side, the data packet stream may be parsed to parse the audio data and action data in the data packet, that is, Demux body BS & audio.

Subsequently, on the user side, a specific rendering tool may be used to output the virtual human through animation rendering (Hifi animator rendering) and the virtual human may be controlled to perform corresponding actions based on the action data. Thus, a high-fidelity Hifi rendered three-dimensional virtual human may be output on the user-side display screen.

Further, on the user side, when the data confidence of the action data in the data packet is low or does not meet the constraints, the action data may be discarded and the action data at the current moment may be predicted through historical data, that is, Packet discard or combine and BS de-jitter.

Also, the user side may collect video data from the user through the camera and transmit the video data to the operator side such that the user's video data may be output on the operator side, that is, Camera video capture. Therefore, for the user side, the operator's virtual human Puppet may be viewed and the actions of the virtual human may be consistent with the actions of the operator Actor. For the operator, the virtual human may be previewed, but also the user's video data may be viewed, such that the operator may be able to promptly understand the user's situation and provide corresponding services.

Figure 12:
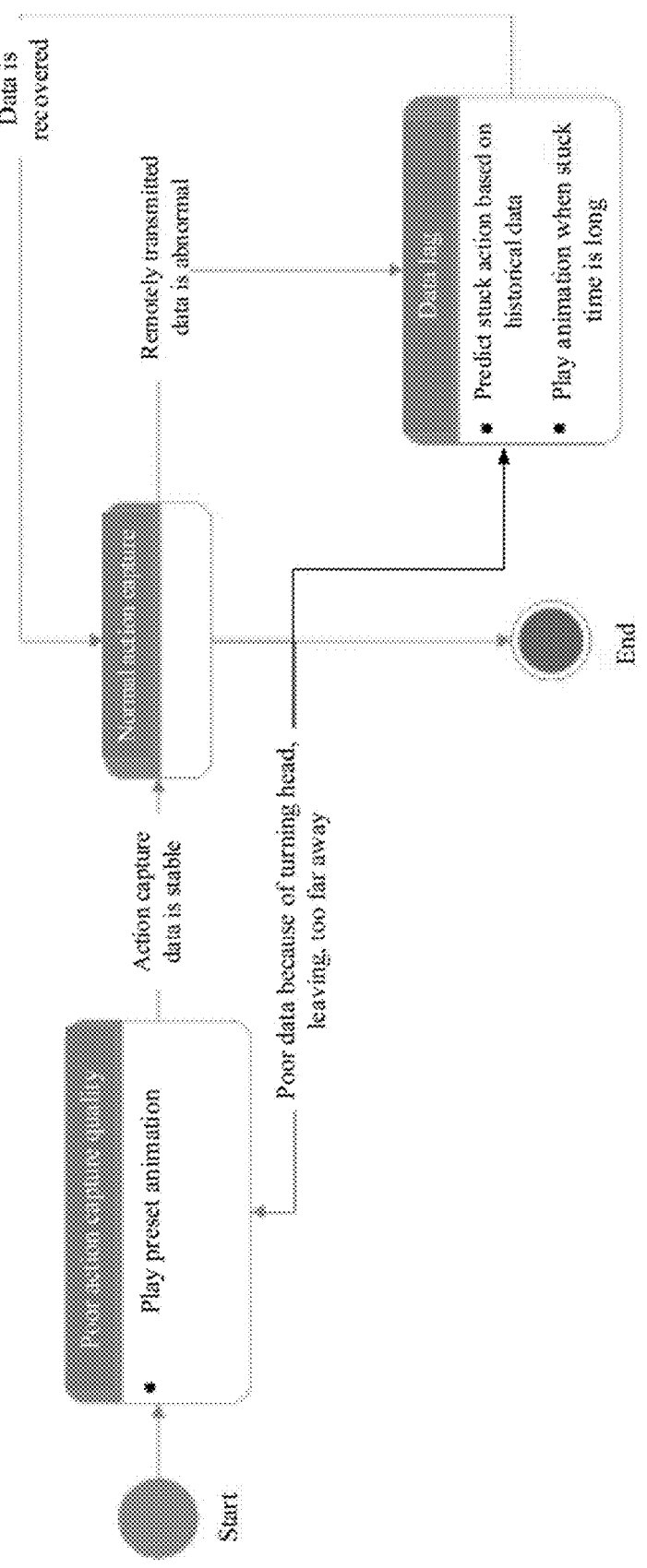
FIG. 12 is a flow chart of a virtual human control by an operator consistent with the present disclosure.

In one embodiment, as shown in FIG. 12, the flow for controlling the virtual human's actions on the user side may include following processes.

1. Preset actions are played when entering.

In the initial stage when the virtual human is output, because of the poor quality of action capture data (i.e., action data), preset animations may be played at this time, that is, the action of the virtual human may be controlled according to the preset action data or the action data matching the response result of the user's input/output.

When the action capture data is stable (the action capture is normal), the frame interpolation process may be performed, so as to switch from the preset animation to real-time data to control the virtual human, that is, the virtual human may be controlled to perform the corresponding actions according to the action data that matches the operator's actions.

2. During the virtual human output process, when the action data matching the operator's actions indicates that the operator performs actions that do not meet the constraint conditions, such as moving, leaving, turning, or going too far, the frame interpolation process may be performed, so as to switch from the real-time data to the preset animation to control the virtual human.

In one embodiment, when it is determined that the quality of the action capture data is poor because of the above reasons, does not meet the constraint conditions, or there is no data or there is data lag, the preset animation may be replayed according to the preset action data or the action data matching the response result of the user's input/output. The matched action data may be used to control the action of the virtual human. In another embodiment, the operator's actions may be predicted based on historical action capture data with good data quality to obtain the predicted stuck action data. Action of the virtual human may be controlled according to the predicted stuck action data. When the predicted stuck action data exceeds the frame number threshold, that is, the stuck time is too long, the prediction quality may decrease. At this time, a close (e.g., similar) pre-recorded animation may be searched for, and it may be transitioned to playing the preset animation through frame interpolation transition.

3. When the remote drive data is lost, the processing process may be the same as 2, and prediction and frame interpolation may be used to reach the preset animation to control the virtual human's actions. Further, in 2 and 3, after the action capture data quality is recovered, the virtual human may continue to be controlled to perform corresponding actions according to the action data that matches the operator's actions.

4. When the preset animation is being played, there may be unnatural situations, such as the mouth shape does not match the sound signal. Therefore, the operator's voice signal may be used to control the change of the virtual human's mouth shape.

In one embodiment, the quality of the action capture data may be judged in the following ways.

1. When the obtained action capture algorithm output includes data confidences, the data confidence in the action capture algorithm output for the action data of each part of the operator may be obtained, and the confidences may be weighted and summed. When the obtained data confidence value is lower than the confidence threshold, the data may be considered unreliable and the data quality may be poor.

2. When the action capture algorithm cannot output data confidence, the virtual human may be driven according to the action capture data, and its actions may be compared with predefined constraints. When the constraints are not met, the data quality may be considered to be poor.

3. In the case of head twisting or other situations, the angle between the facial orientation output by the action capture algorithm and the camera orientation. When it is larger than the angle threshold, the head twist may be considered large and the constraints are not met, and the data quality may be considered poor.

In summary, after the technical solution of the present disclosure is adopted, the virtual human may be prevented from outputting distorted actions because of the action capture data with poor quality when the operator initially enters the interactive scene. Smooth processing may be achieved by controlling the actions of the virtual human to avoid large fluctuations in the movement changes, allowing virtual humans to present more natural services to users.

Each embodiment in this specification is described in a progressive mode, and each embodiment focuses on the difference from other embodiments. Same and similar parts of each embodiment may be referred to each other. As for the device disclosed in the embodiments, since it corresponds to the method disclosed in the embodiments, the description is relatively simple, and for relevant details, the reference may be made to the description of the method embodiments.

Units and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

In the present disclosure, the drawings and descriptions of the embodiments are illustrative and not restrictive. The same drawing reference numerals identify the same structures throughout the description of the embodiments. In addition, figures may exaggerate the thickness of some layers, films, screens, areas, etc., for purposes of understanding and ease of description. It will also be understood that when an element such as a layer, film, region or substrate is referred to as being "on" another element, it may be directly on the another element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are only for the convenience of describing the present disclosure, rather than indicating or implying that the device or element referred to must have a specific orientation, be constructed and operated in a specific orientation, and therefore cannot be construed as a limitation of the present disclosure. When a component is said to be "connected" to another component, it may be directly connected to the other component or there may be an intermediate component present at the same time.

It should also be noted that in this article, relational terms such as "first" and "second" are only used to distinguish one entity or operation from another entity or operation, and do not necessarily require or imply that there is such actual relationship or sequence between these entities or operations them. Furthermore, the terms "comprises," "includes," or any other variation thereof are intended to cover a non-exclusive inclusion, such that an article or device including a list of elements includes not only those elements, but also other elements not expressly listed. Or it also includes elements inherent to the article or equipment. Without further limitation, an element associated with the statement "comprises a . . . " does not exclude the presence of other identical elements in an article or device that includes the above-mentioned element.

The disclosed equipment and methods may be implemented in other ways. The device embodiments described above are only illustrative. For example, the division of the units is only a logical function division. In actual implementation, there may be other division methods, such as: multiple units or components may be combined, or can be integrated into another system, or some features can be ignored, or not implemented. In addition, the coupling, direct coupling, or communication connection between the components shown or discussed may be through some interfaces, and the indirect coupling or communication connection of the devices or units may be electrical, mechanical, or other forms.

The units described above as separate components may or may not be physically separated. The components shown as units may or may not be physical units. They may be located in one place or distributed to multiple network units. Some or all of the units may be selected according to actual needs to achieve the purpose of the solution of the present disclosure.

In addition, all functional units in the embodiments of the present disclosure may be integrated into one processing unit, or each unit may be separately used as a unit, or two or more units can be integrated into one unit. The above-mentioned integration units can be implemented in the form of hardware or in the form of hardware plus software functional units.

All or part of the steps to implement the above method embodiments may be completed by hardware related to program instructions. The aforementioned program may be stored in a computer-readable storage medium. When the program is executed, the steps including the above method embodiments may be executed. The aforementioned storage media may include: removable storage devices, ROMs, magnetic disks, optical disks or other media that can store program codes.

When the integrated units mentioned above in the present disclosure are implemented in the form of software function modules and sold or used as independent products, they may also be stored in a computer-readable storage medium. Based on this understanding, the technical solutions of the embodiments of the present disclosure in essence or those that contribute to the existing technology may be embodied in the form of software products. The computer software products may be stored in a storage medium and include a number of instructions for instructing the product to perform all or part of the methods described in various embodiments of the present disclosure. The aforementioned storage media may include: random access memory (RAM), read-only memory (ROM), electrical-programmable ROM, electrically erasable programmable ROM, register, hard disk, mobile storage device, CD-ROM, magnetic disks, optical disks, or other media that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. An output method comprising:
controlling a virtual character to perform action according to a first mode; and
controlling the virtual character to perform action according to a second mode different from the first mode,
wherein:
one of the first mode and the second mode includes controlling the virtual character to perform action at least according to first control data, the first control data including action data matching an operator's action; and
another one of the first mode and the second mode includes controlling the virtual character to perform action at least according to second control data, the second control data including action data matching a response result obtained in response to input/output, and the action data matching the response result is obtained by at least one of: inputting the response result to a pre-trained action processing model that outputs the action data; or searching an action list that associates the response result with the action data.

2. The method according to claim 1, wherein the action data in the first control data is obtained by:
receiving a data packet containing audio data and action data corresponding to a same target time period; and
processing the data packet to obtain the audio data and the action data in the data packet, the action data in the data packet being used as the first control data to control the virtual character to perform action and the audio data in the data packet being used to control a sound signal corresponding to the virtual character.

3. The method according to claim 1, wherein controlling the virtual character to perform action according to the second mode includes:
in response to a switch condition being met, controlling the virtual character to perform action according to the second mode.

4. The method according to claim 3, wherein the switch condition includes at least one of:
a matching degree between action data in the first mode for controlling the virtual character to perform action and the operator's action satisfies a matching-degree control condition;
an action parameter of a key point included in the action data in the first mode for controlling the virtual character to perform action does not meet an action constraint condition corresponding to a part to which the key point belongs;
a duration for which the virtual character is output is longer than or equal to a preset duration threshold;

action data in the second mode for controlling the virtual character to perform action is received;

an interactive action performed by the virtual character after being output satisfies an interactive control condition;

a switch instruction is received, the switch instruction being generated based on a switch operation of a user of an electronic device; or a response result for matching the action data in the first mode is not obtained.

5. The method according to claim 3, further comprising, before controlling the virtual character to perform action according to the second mode:

according to the first control data and the second control data, obtaining third control data, the first control data being used to control the virtual character to perform action in the first mode and the second control data being used to control the virtual character to perform action in the second mode; and controlling the virtual character to perform action according to the third control data.

6. The method according to claim 3, further comprising:

recording interaction information during a process when the virtual character is controlled in the first mode, the interaction information being able to be obtained at least when the virtual character is controlled in the second mode.

7. The method according to claim 1, wherein:

the virtual character is controlled to perform action according to the first mode in response to a first condition being met;

the virtual character is controlled to perform action according to the second mode in response to a second condition being met;

the first condition includes at least one of:

a matching degree between action data in the first mode for controlling the virtual character to perform action and the operator's action satisfies a matching-degree control condition;

an action parameter of a key point included in the action data in the first mode for controlling the virtual character to perform action meets an action constraint corresponding to a part to which the key point belongs;

a duration for which the virtual character is output is shorter than or equal to a preset duration threshold;

the action data in the first mode for controlling the virtual character to perform action is received;

an interactive action performed by the virtual character after being output satisfies an interactive control condition;

a first instruction is received, the first instruction being generated based on a first operation of a user of an electronic device; or a response result for matching action data in the second mode for controlling the virtual character to perform action is not obtained; and the second condition includes at least one of:

the matching degree between the action data in the first mode for controlling the virtual character to perform action and the operator's action does not satisfy the matching-degree control condition;

the action parameter of the key point included in the action data in the first mode for controlling the virtual character to perform action does not meet the action constraint corresponding to the part to which the key point belongs;

the duration for which the virtual character is output is longer than the preset duration threshold;

the action data in the first mode for controlling the virtual character to perform action is not received;

the interactive action performed by the virtual character after being output does not satisfy the interactive control condition;

a second instruction is received, the second instruction being generated based on a second operation of the user of the electronic device; or a response result for matching the action data in the first mode for controlling the virtual character to perform action is not obtained.

8. The method according to claim 1, wherein:

the first mode includes controlling a first sub-object of the virtual character to perform action; and the second mode includes controlling a second sub-object of the virtual character to perform action, the first sub-object being different from the second sub-object.

9. The method according to claim 8, wherein:

the first mode includes controlling the first sub-object to perform action at least according to the first control data.

10. The method according to claim 8, wherein:

the first mode includes controlling the first sub-object to perform action according to a first control parameter;

the second mode includes controlling the second sub-object to perform action according to a second control parameter;

wherein:

each of the first control parameter and the second control parameter includes at least one of a control frame rate or a control precision.

11. An electronic device comprising:

an output device configured to output a virtual character; and a processor configured to:

control the virtual character to perform action according to a first mode; and control the virtual character to perform action according to a second mode different from the first mode, wherein:

one of the first mode and the second mode includes controlling the virtual character to perform action at least according to first control data, the first control data including action data matching an operator's action; and another one of the first mode and the second mode includes controlling the virtual character to perform action at least according to second control data, the second control data including action data matching a response result obtained in response to input/output, and the action data matching the response result is obtained by at least one of: inputting the response result to a pre-trained action processing model that outputs the action data; or searching an action list that associates the response result with the action data.

12. The electronic device according to claim 11, wherein the action data in the first control data is obtained by:

receiving a data packet containing audio data and action data corresponding to a same target time period; and processing the data packet to obtain the audio data and the action data in the data packet, the action data in the data packet being used as the first control data to control the virtual character to perform action and the audio data in the data packet being used to control a sound signal corresponding to the virtual character.

13. The electronic device according to claim 11, wherein the processor is further configured to:

in response to a switch condition being met, control the virtual character to perform action according to the second mode.

14. The electronic device according to claim 13, wherein the switch condition includes at least one of:

a matching degree between action data in the first mode for controlling the virtual character to perform action and the operator's action satisfies a matching-degree control condition;

an action parameter of a key point included in the action data in the first mode for controlling the virtual character to perform action does not meet an action constraint condition corresponding to a part to which the key point belongs;

a duration for which the virtual character is output is longer than or equal to a preset duration threshold;

action data in the second mode for controlling the virtual character to perform action is received;

an interactive action performed by the virtual character after being output satisfies an interactive control condition;

a switch instruction is received, the switch instruction being generated based on a switch operation of a user of an electronic device; or a response result for matching the action data in the first mode is not obtained.

15. The electronic device according to claim 13, wherein the processor is further configured to, before controlling the virtual character to perform action according to the second mode:

according to the first control data and the second control data, obtain third control data, the first control data being used to control the virtual character to perform action in the first mode and the second control data being used to control the virtual character to perform action in the second mode; and control the virtual character to perform action according to the third control data.

16. The electronic device according to claim 13, wherein the processor is further configured to:

record interaction information during a process when the virtual character is controlled in the first mode, the interaction information being able to be obtained at least when the virtual character is controlled in the second mode.

17. The electronic device according to claim 11, wherein:

the virtual character is controlled to perform action according to the first mode in response to a first condition being met;

the virtual character is controlled to perform action according to the second mode in response to a second condition being met;

the first condition includes at least one of:

a matching degree between action data in the first mode for controlling the virtual character to perform action and the operator's action satisfies a matching-degree control condition;

an action parameter of a key point included in the action data in the first mode for controlling the virtual character to perform action meets an action constraint corresponding to a part to which the key point belongs;

a duration for which the virtual character is output is shorter than or equal to a preset duration threshold;

the action data in the first mode for controlling the virtual character to perform action is received;

an interactive action performed by the virtual character after being output satisfies an interactive control condition;

a first instruction is received, the first instruction being generated based on a first operation of a user of an electronic device; or a response result for matching action data in the second mode for controlling the virtual character to perform action is not obtained; and the second condition includes at least one of:

the matching degree between the action data in the first mode for controlling the virtual character to perform action and the operator's action does not satisfy the matching-degree control condition;

the action parameter of the key point included in the action data in the first mode for controlling the virtual character to perform action does not meet the action constraint corresponding to the part to which the key point belongs;

the duration for which the virtual character is output is longer than the preset duration threshold;

the action data in the first mode for controlling the virtual character to perform action is not received;

the interactive action performed by the virtual character after being output does not satisfy the interactive control condition;

a second instruction is received, the second instruction being generated based on a second operation of the user of the electronic device; or a response result for matching the action data in the first mode for controlling the virtual character to perform action is not obtained.

18. The electronic device according to claim 11, wherein:

the first mode includes controlling a first sub-object of the virtual character to perform action; and the second mode includes controlling a second sub-object of the virtual character to perform action, the first sub-object being different from the second sub-object.

* * * * *